(12) United States Patent
Burnsed et al.

(10) Patent No.: US 12,072,506 B2
(45) Date of Patent: Aug. 27, 2024

(54) APPARATUS AND METHOD FOR SIMPLIFYING A CONTROL INTERFACE OF A NIGHT VISION SYSTEM USING BI-DIRECTIONAL DETECTOR/DISPLAY OVERLAY

(71) Applicant: L3Harris Technologies, Inc., Melbourne, FL (US)

(72) Inventors: Jon D. Burnsed, Tempe, AZ (US); Jacob J. Becker, Gilbert, AZ (US); Eric Ramsey, Londonderry, NH (US)

(73) Assignee: L3HARRIS TECHNOLOGIES, INC., Melbourne, FL (US)

( * ) Notice: Subject to any disclaimer, the term of this patent is extended or adjusted under 35 U.S.C. 154(b) by 120 days.

(21) Appl. No.: 17/519,100

(22) Filed: Nov. 4, 2021

(65) Prior Publication Data

US 2023/0135448 A1 May 4, 2023

(51) Int. Cl.
  *G02B 27/01* (2006.01)
  *G02B 23/12* (2006.01)

(52) U.S. Cl.
  CPC ......... *G02B 27/0189* (2013.01); *G02B 23/12* (2013.01); *G02B 27/0101* (2013.01); *G02B 2027/014* (2013.01); *G02B 2027/0141* (2013.01)

(58) Field of Classification Search
  CPC ............ G02B 27/0189; G02B 27/0101; G02B 2027/014; G02B 2027/0141
  See application file for complete search history.

(56) References Cited

U.S. PATENT DOCUMENTS

| | | | |
|---|---|---|---|
| 7,605,921 B2 * | 10/2009 | Hietanen | G01N 21/89 250/559.1 |
| 8,560,753 B1 * | 10/2013 | Hobbs | G09G 5/14 710/72 |

(Continued)

FOREIGN PATENT DOCUMENTS

| | | |
|---|---|---|
| WO | 2004/002143 | 12/2003 |
| WO | 2007/049213 | 5/2007 |

OTHER PUBLICATIONS

U.S. Appl. No. 16/868,306 dated May 6, 2020.
European Search Report received for EP Patent Application No. 22204616.1, mailed on Mar. 10, 2023, 11 pages.

*Primary Examiner* — Grace Q Li
(74) *Attorney, Agent, or Firm* — Workman Nydegger

(57) ABSTRACT

An apparatus and method are provided for a night vision system including a transparent overlay display that transmit direct-view light representing an intensified image and emits display light representing a display image. To reduce the communication bandwidth with an external controller, a frame buffer is provided to locally update pixel values of the display image, at a first frame rate. Because many pixel values remain unchanged from frame to frame, an external controller may change the pixel values stored in the frame buffer as needed, reducing the amount of information that is needed from the external controller to control the display image. Additionally, to reduce the communication bandwidth the display information may be communicated from the external controller using a high-level language. Further, some of the display information may be determined using a local processor, rather than relying on the external controller for the display information.

20 Claims, 9 Drawing Sheets

(56) References Cited

U.S. PATENT DOCUMENTS

| | | |
|---|---|---|
| 9,097,891 B2 | 8/2015 | Border et al. |
| 2003/0020084 A1 | 1/2003 | Fan et al. |
| 2013/0342474 A1 | 12/2013 | Sultenfuss et al. |
| 2016/0380744 A1* | 12/2016 | Aryafar ............ H04W 28/0268 370/277 |
| 2018/0020143 A1* | 1/2018 | Funamizu .............. H04N 25/50 |
| 2018/0328581 A1* | 11/2018 | Komanduri ............ G09F 13/04 |
| 2019/0198576 A1* | 6/2019 | Schubert ............... G02B 26/06 |
| 2019/0220948 A1* | 7/2019 | Chuang ................... G06T 1/60 |
| 2020/0074724 A1* | 3/2020 | Mathur .................. G06F 3/013 |
| 2020/0394408 A1* | 12/2020 | Sydorenko ........... G06V 30/142 |
| 2020/0400944 A1 | 12/2020 | Burnsed et al. |
| 2021/0084287 A1 | 3/2021 | Keesling et al. |
| 2021/0335566 A1* | 10/2021 | Smith ..................... H01J 9/233 |
| 2021/0400944 A1 | 12/2021 | Burnsed et al. |
| 2022/0173276 A1* | 6/2022 | Teo ...................... H01L 33/385 |
| 2022/0189078 A1* | 6/2022 | Yoneda .................. G06F 18/24 |

\* cited by examiner

FIG. 7

APPARATUS AND METHOD FOR SIMPLIFYING A CONTROL INTERFACE OF A NIGHT VISION SYSTEM USING BI-DIRECTIONAL DETECTOR/DISPLAY OVERLAY

BACKGROUND

Night vision (NV) systems allow users to see in low-light environments without flooding the environment with visible light. Accordingly, NV systems can be used for covert vision in low-light environments. By enabling sight without illumination in the visible or other spectra, NV systems protect users from being detected.

Analog NV systems function by receiving low levels of light and intensifying the received light using an image intensifier. The image intensifier has a photocathode that emits electrons in response to incident photons. The emitted electrons are accelerated through a vacuum tube and directed towards a microchannel plate that amplifies the signal by multiplying the number of electrons. The multiplied electrons then strike a phosphor screen, and, via the phenomenon of luminescence, the phosphor screen emits photons in response to radiant energy (e.g., the electrons). The luminescent light from the phosphor screen is coupled through a series of optics to the user. For example, the luminescent light may be coupled through an inverting fiber optic to an eyepiece where the user can view the illuminated phosphor screen, thus allowing the user to see the objects.

Analog NV systems can include an overlay display that transmits a direct-view, intensified image through the overlay display and emits display light representing a display image from the overlay display to thereby generate a combined image with the display image superimposed over the direct-view, intensified image. The overlay display can be used to convey various information to the user, such as temperatures, distances, indicators marking objects, situational awareness messages, messages from other users, etc.

A challenge of adding an overlay display to an analog NV system is that this addition can increase the size, weight, and power of the analog NV system. For example, if each pixel of the display image is determined by an external controller and the entire display image is updated each time the frame is updated (i.e., at the frame rate), then considerable power will be consumed by the communications interfaces between the external controller and the overlay display because each pixel value will be communicated via the communications interfaces during each period of the frame rate. Accordingly, improved analog NV systems and overlay displays are desired that more efficiently control and update the display image.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes an optical device that includes a semiconductor chip configured to receive first light of an underlying image and superimpose second light of a display image over the underlying image. The semiconductor chip includes light emitters formed on the semiconductor chip to emit the second light, the light emitters representing respective pixels of the display image, the light emitters being configured to emit the second light with an intensity emitted based on respective pixel values of the display image, and transparent regions being arranged between the light emitters. The optical device includes a frame buffer that stores pixel values in a computer readable memory. The frame buffer communicates the pixel values to the light emitters at a first frame rate. The optical device includes a processor configured to update pixel values stored in the frame buffer at a second frame rate.

Another embodiment illustrated herein is a method of updating pixel values of a display image superimposed over an underlying image. The method includes transmitting first light representing an underlying image through transparent regions of a semiconductor chip. The semiconductor chip superimposes the second light of a display image over the underlying image. The method further includes emitting the second light from light emitters formed on the semiconductor chip. The light emitters represent respective pixels of the display image. the light emitters emit the second light with an intensity based on respective pixel values of the display image. The transparent regions, which transmit the first light, are arranged between the light emitters. The pixel values are stored in a frame buffer comprising a computer readable memory. The method further includes transferring the pixel values stored in the frame buffer to the light emitters at a first frame rate. And a processor updates the pixel values stored in the frame buffer at a second frame rate.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 7 illustrates pixel values representing a character "H," according to one embodiment;

DETAILED DESCRIPTION

Figure 1A:
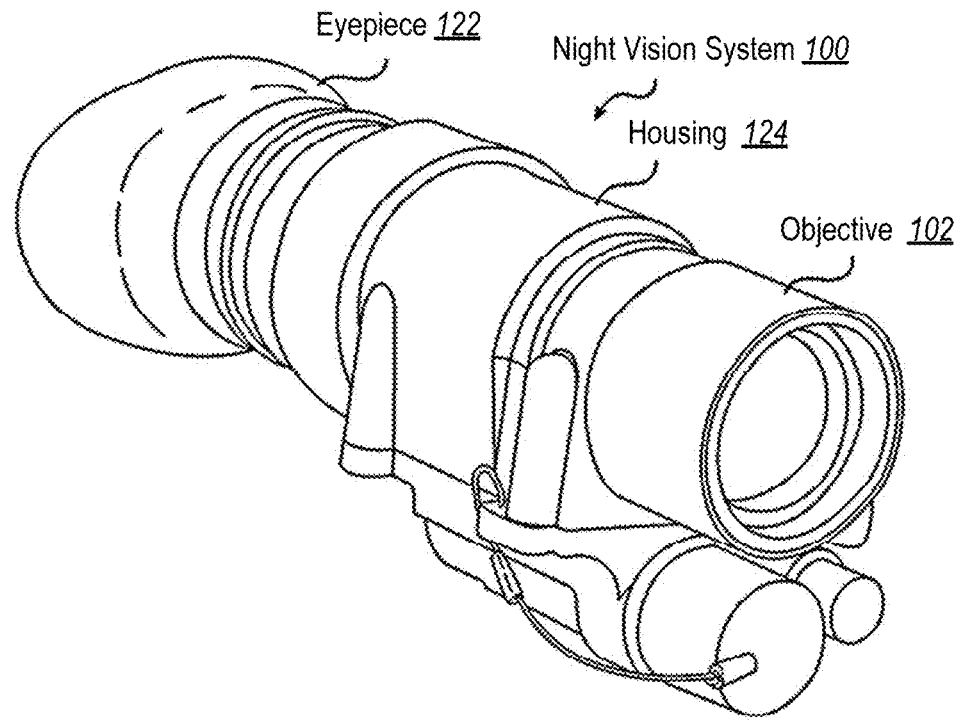
FIG. 1A illustrates a perspective view of a night vision (NV) system, according to one embodiment.

As discussed above, the size, weight, and power of an analog night vision (NV) system may be reduced by using a more efficient overlay display. For example, the NV system can be improved by using more efficient techniques to determine and update the pixel values in the overlay display image and communicate data indicating the pixel values to be displayed from an external controller. For example, rather than determining the display image and pixel values using an external controller and communicating those pixel values from the external controller using a high-speed parallel communication interface, the pixel values could be controlled by a specialized frame driver, which is either on the same chip as the overlay display or at least on the same PC board.

In certain embodiments, rather than always updating pixel values from an external controller, the frame driver may include a local frame buffer containing a memory array that represents the pixel values of each pixel in a fixed order. Updating the display image is then performed by locally reading these pixel values out at desired frame rate. The frame rate may be separately adjustable relative to the rate at which the values in the frame buffer are updated/changed. Further, the communication bandwidth required for updating the image can be reduced by only communicating those pixel values that change relative to the previous frame. Thus, the local frame buffer reduces the volume of information to be communicated from (and to) an external controller.

In certain embodiments, the change in pixel values can be determined locally, as opposed to being communicated from an external controller. For example, the overlay display may include an array of detectors, and information or symbols being displayed may be determined based on the signals detected by the array of detectors. Rather than sending the detected signals to an external controller and then receiving the information or symbols to be displayed from the external controller, a local processor can process the detected signals and generate therefrom the information or symbols to be displayed. The local processor may be on the same chip as the overlay display or at least on the same PC board. Examples of information or symbols derived from detected signals may include, e.g., an outline designating an object of interest, which was determined based on edge detection or change detection performed on an acquired image (i.e., the detected signals), a text message derived from a modulated infrared light (e.g., infrared (IR) beacon modulated using pulse frequency code modulation). Additional examples are discussed below.

Generally, each of the techniques described herein reduces the amount of information needed from an external controller to determine pixel values in the display image. Without these techniques, an NV system having an integrated overlay display tends to draw a lot of electrical power when the overlay display uses a high-speed parallel data interface to update the entire pixel array at the specified frame rate (e.g., 60 Hz) regardless of whether the value of a particular pixel changes from frame to frame.

For many applications using an overlay display, the underlying image over which the overlay display is superimposed is of primary importance. Accordingly, in some embodiments, the overlay image is only superimposed part of the time (e.g., much of the time, the pixel array will be held to zero, i.e., off) or is only superimposed over a small fraction of the pixels in the overlay display (e.g., a small percentage of pixel have non-zero pixel values). This enables a user to see the underlying image as clearly as possible with as few obstructions as possible. For NV systems, enabling the user to see the underlying image can be important when the underlying image is of primary significance and the overlay display serves a secondary function as an augmented reality accentuator.

As mentioned above, using a high-speed parallel data interface to update the entire pixel array at the specified frame rate (e.g., 60 Hz) may be inefficient when the display image is sparse (e.g., few pixel values are non-zero) and/or mostly static (e.g., the pixel values change infrequently). This inefficiency is especially problematic in NV systems due to the premium on size, weight, and power. For example, in a covert operation in which a war fighter uses a head-mounted, battery-powered NV system, bad results may occur if the battery is exhausted before the covert operation is complete (e.g., a war fighter should not need to change batteries in the middle of a fire fight, or have to carry batteries rather than other necessities). Further, weight is important because the head mounted NV system applies torque to the user's neck, potentially causing fatigue and injury unless the weight is kept reasonably low.

To reduce size, weight, and power, the embodiments disclosed herein reduce (or eliminate) the data required from an external controller to determine the pixel values of a display image. For example, the embodiments disclosed herein avoid the requirement for a high-speed parallel data interface that updates the entire pixel array at the specified frame rate. One technique to reduce the interface data rate is to update only the value of those pixels that change from one frame to the next. Another technique is to determine some or all the pixel values using a local processor. A third technique is to use a high-level language to minimize the amount to data to be communicated across the data interface (e.g., providing text as a character string), and then a local processor converts the received data in the high-level language to low-level pixel values.

These techniques are advantageous for many reasons. As discussed above, these techniques reduce the size, weight, and power of the NV system. Additionally, these techniques may reduce electromagnetic interference due to the communications interface.

Figure 1B:
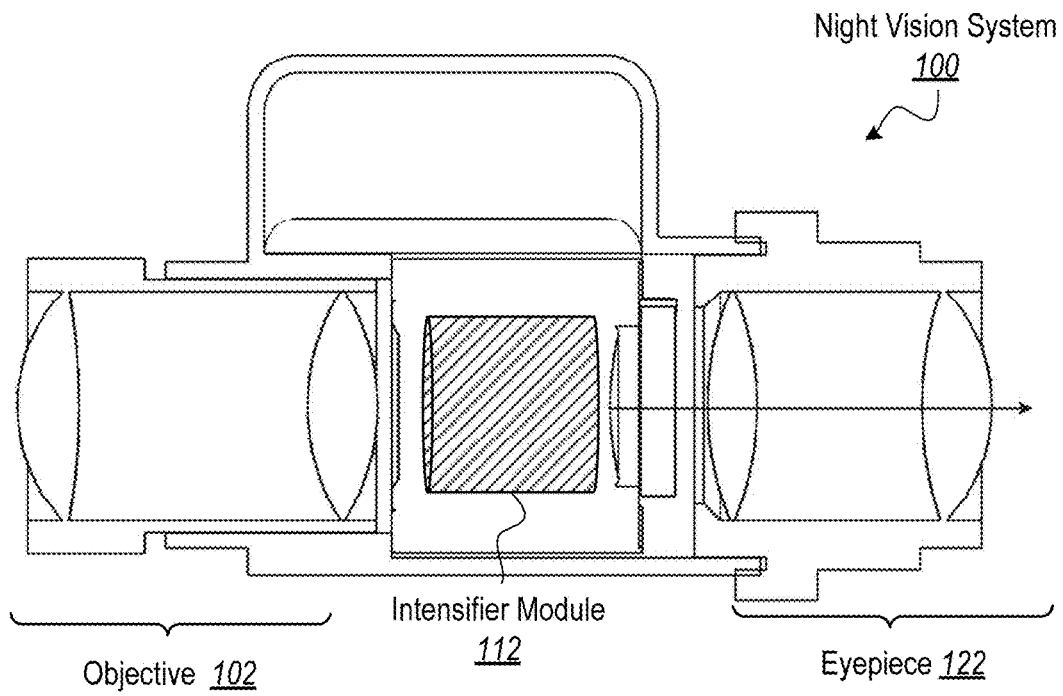
FIG. 1B illustrates a side cutaway view of the NV system, according to one embodiment.

Referring now to FIGS. 1A and 1B, a non-limiting example of a NV system is illustrated. In particular, FIGS. 1A and 1B illustrate a PVS—14 NV system 100. In the example illustrated, the NV system 100 includes a housing 124, which houses an image intensifier module 112. The NV system 100 further includes an objective 102 which receives light from an environment. The objective 102 includes optics such as lenses, waveguides, and/or other optical components for receiving and transmitting light to the image intensifier module 112. The NV system 100 further includes an eyepiece 122. The eyepiece 122 includes optics for focusing images created by the NV system 100 into the eye of the user.

Figure 2:
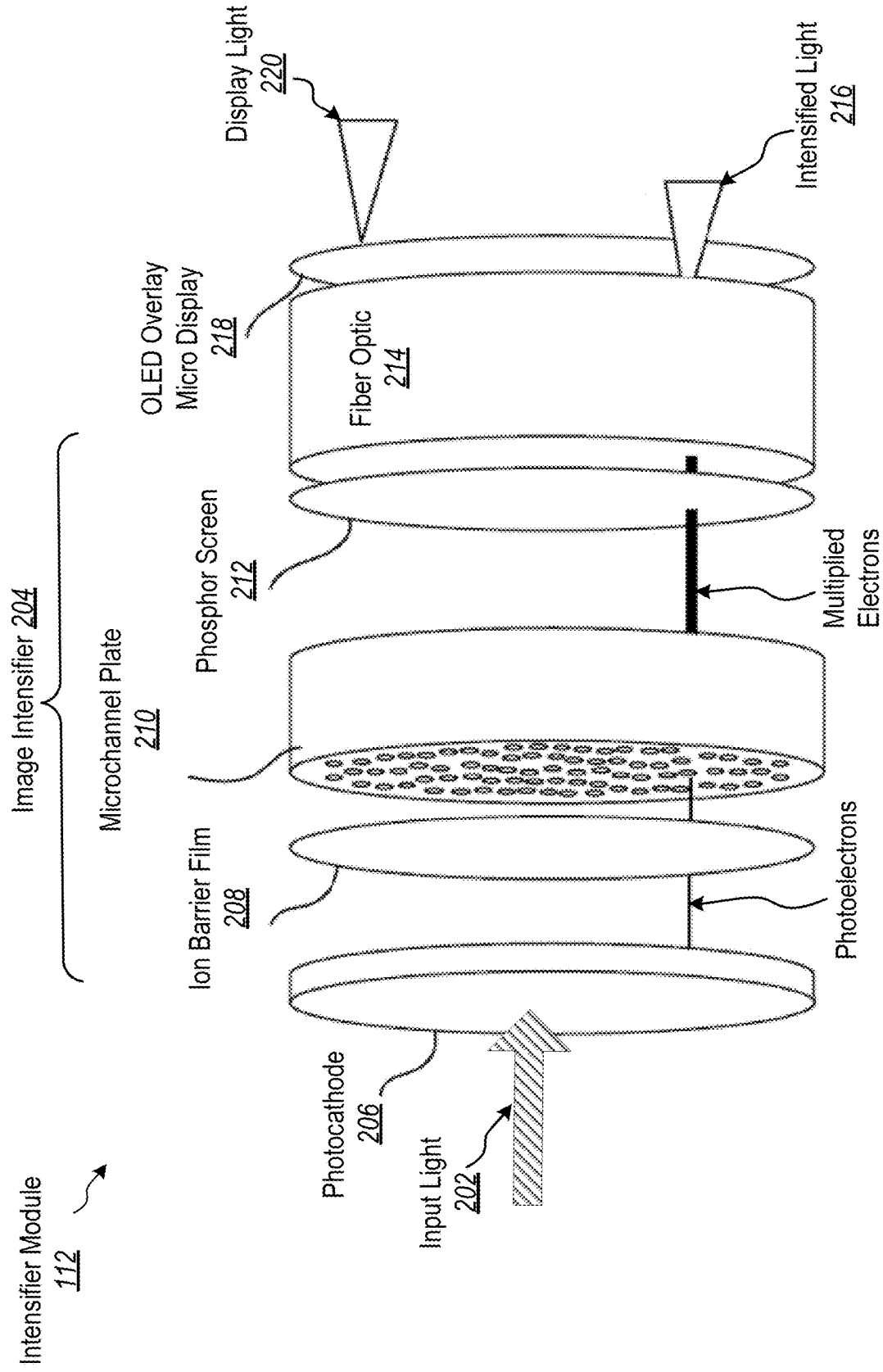
FIG. 2 illustrates a schematic diagram of an intensifier module of the NV system, according to one embodiment.

FIG. 2 illustrates the image intensifier module 112, according to one example. The image intensifier module 112 includes an image intensifier 204 without an overlay display. The light from the image intensifier module 112 is captured by the eyepiece 122 and directed to the user.

The image intensifier module 112 receives the input light 202, which has been transmitted through the objective 102 to the image intensifier module 112. The input light 202 may be dim light from a nighttime environment that would be challenging to see with the naked eye.

The objective directs the input light 202 into the image intensifier 204. The image intensifier 204 may include functionality for amplifying the received image so that the amplified image is sufficiently bright to be readily seen by the user. In the illustrated embodiment, this amplification is accomplished using a photocathode 206, a microchannel plate 210, and a phosphor screen 212. The photocathode 206 absorbs incident photons and outputs electrons in response. The electrons may pass through an optional ion barrier film 208. Electrons from the photocathode 206 are accelerated across an electric potential and transmitted through the microchannel plate 210 to multiply the number of electrons. The multiplied electrons then strike a phosphor screen 212, converting the energy from electrons to photons via the phenomenon of luminescence. The phosphor screen 212 thus converts the radiant energy of the multiplied electrons to luminescent light. Accordingly, the phosphor screen 212 glows due to electrons from the microchannel plate 210 striking the phosphor screen 212, creating an intensified image that represents the image of the input light 202. A fiber-optic element 214 carries the intensified light 216 to the overlay display 218.

Figure 3:
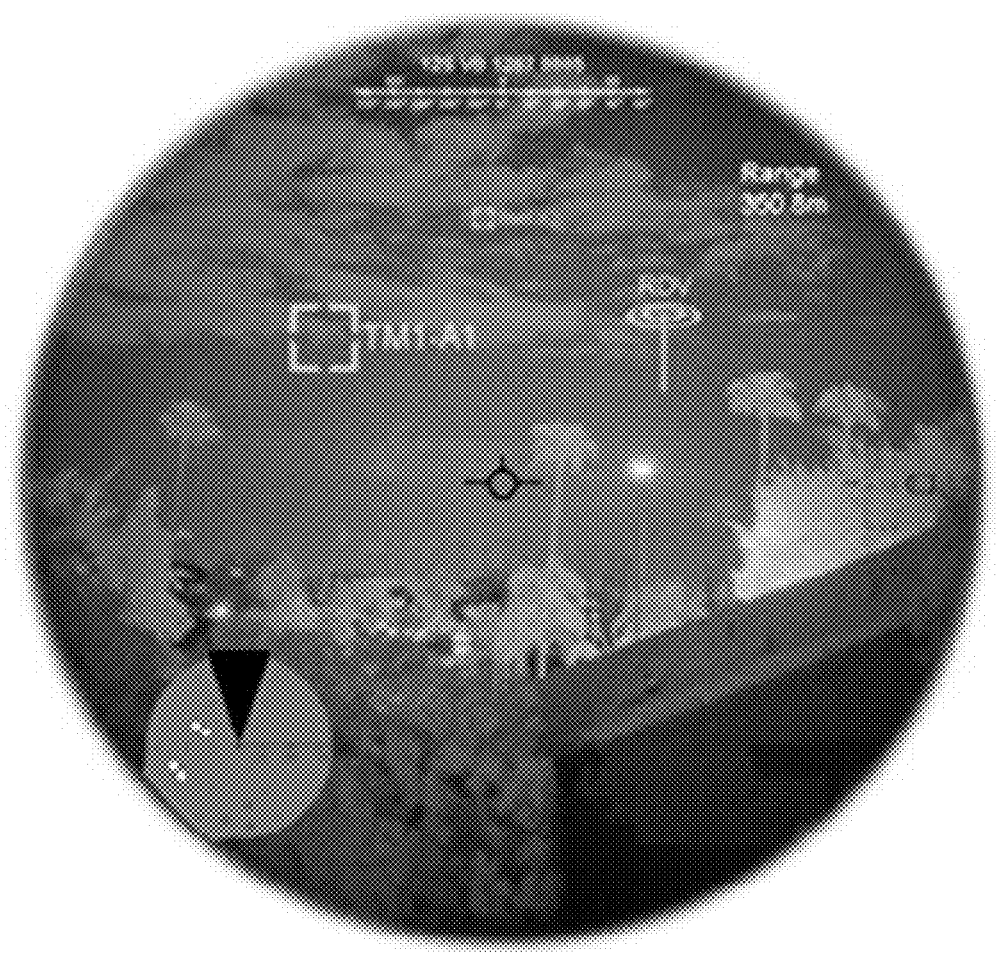
FIG. 3 illustrates an intensified image superimposed with an overlay image, according to one embodiment.

The overlay display 218 generates display light 220, which is superimposed with the intensified light 216. For example, the overlay display 218 may include functionality for displaying information to a user. Such information may include graphical content, including text, images, superimposed thermal image data and the like. FIG. 3. Additional details regarding certain embodiments of the NV system 100 and the overlay display 218 are provided in U.S. patent application Ser. No. 16/868,306, filed on May 6, 2020, titled "Backside Etch Process for Transparent Silicon Oxide Technology", which is incorporated herein by reference in its entirety.

FIG. 3 illustrates an example of an image in which an overlay display 218 superimposes text and other graphical symbols over an amplified image of a nightscape that includes trees and clouds. As discussed above, the overlay display 218 may include functionality for displaying information to a user. Such information may include graphical content, including text, images, superimposed thermal image data and the like. The overlay display 218 outputs display light 220 which can be sent to the eyepiece. Thus, an image such as that illustrated in FIG. 3 is presented to the user in the NV system 100.

Figure 4A:
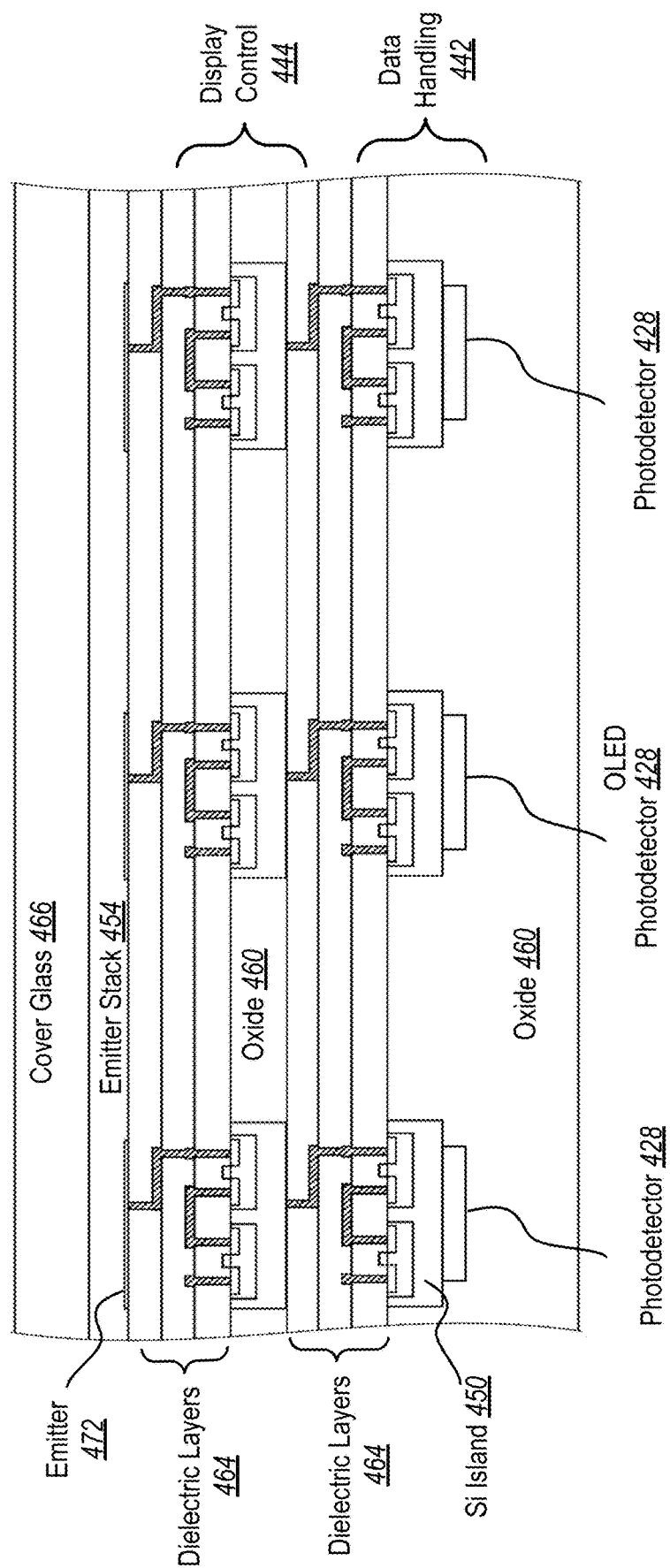
FIG. 4A illustrates a diagram of a portion of an overlay display, according to one embodiment.
Figure 4B:
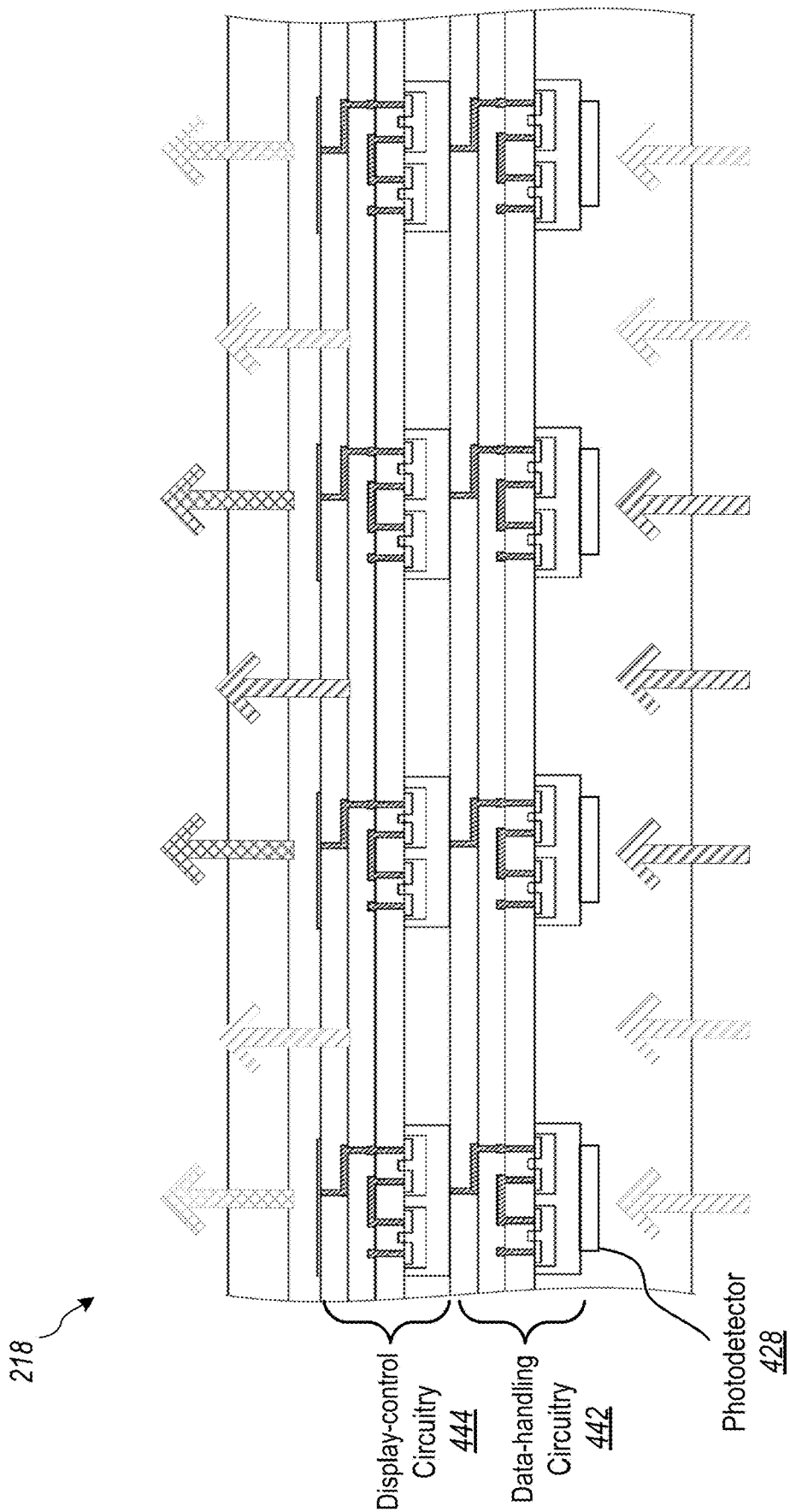
FIG. 4B illustrates a diagram of light passing through transparent regions of a portion of the overlay display, according to one embodiment.

FIGS. 4A and 4B illustrate example embodiments of the overlay display 218. For example, the overlay display 218 may include several active silicon areas 450 function as circuit components, such a field effect transistors (FETs). In certain embodiments, one plane of circuits elements may be provided as display-control circuitry 444, and another plane of circuits elements may be provided as data-handling circuitry 442. The display-control circuitry 444 may control respective pixels of the overlay display 218. In certain embodiments, the overlay display 218 may be a digital display having a certain pixel density. Each pixel has one or more transistors controlling one or more emitters 472 (e.g., the emitters 472 may be organic light emitting diodes (OLEDs)). Additional details regarding the overlay display 218 are provided in U.S. patent application Ser. No. 16/868, 306.

FIG. 4A illustrates a cross-section of a part of the overlay display 218. In certain non-limiting embodiments, the overlay display 218 may include active silicon areas, which are illustrated as active silicon islands 450 (e.g., native silicon islands). The active silicon islands 450 can be used to fabricate transistors, such as MOSFETs by doping the silicon (Si) with spatially varying concentrations of donor and acceptor atoms. Further, the MOSFETs may be fabricated using intermetal and dielectric layers 464 that include insulators (e.g., oxides and dielectrics) and metal traces 456. In certain embodiments, the MOSFETs may provide (but are not limited to providing) logic functions and/or control functions.

FIG. 4B illustrates the overlay display 218 superimposing a display image over the intensified image. For example, a display image is generated by outputting the display light 220. In FIG. 4B, the intensified light 216 enters the overlay display 218 from the bottom, passes through the oxide 460 and then through the other layers before exiting the overlay display 218 through the cover glass 466. The display light 220 is generated in the emitter 472, and, like the intensified light 216, the display light 220 exits through the cover glass 466. After exiting through the cover glass 466, both the display light 220 and the intensified light 216 are transmitted to the eyepiece 122 of the NV system 100, and then to the user.

Whereas the pixels (i.e., Si island 450, metal traces 456, and emitters 472 in the emitter stack 454) substantially attenuate the intensified light 216, transparent regions between the pixels are at least partially transparent to the intensified light 216. Accordingly, the intensified light 216 is transmitted through the transparent regions between the pixels of the overlay display 218. In contrast, the active Si islands 450 and the metal traces 456 substantial block the intensified light 216.

In both FIGS. 4A and 4B, the circuit components are fabricated in more than one plane, whereas in other embodiments (not shown) the circuit components may be fabricated in a single plane. Different functions may be performed by circuitry in different planes. For example, FIG. 4A illustrates a certain embodiment of the overlay display 218 in which a first set of fabrication layers implement the display-control circuitry 444 (e.g., circuitry to drive the emitters 472 and generate display light 220). A second set of fabrication layers implement the data-handling circuitry 442. Thus, the display-control circuitry 444 and the data-handling circuitry 442 are respectively fabricated in separate circuitry planes.

Figure 5:
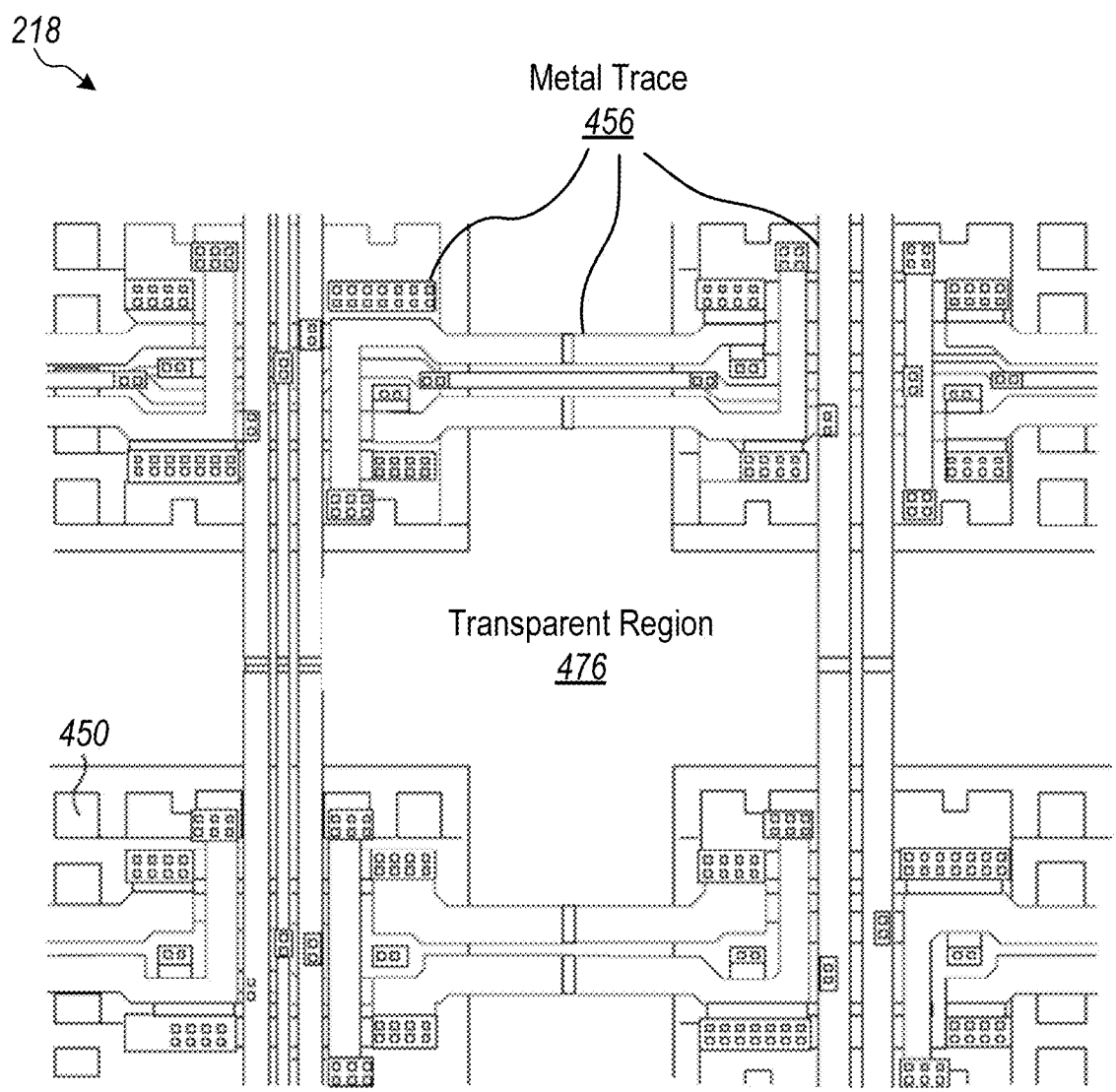
FIG. 5 illustrates a top-down view of a portion of an overlay display, according to one embodiment.

FIG. 5 illustrates a top-down view of a portion of an overlay display 218 in which the opaque regions (e.g., regions including the active Si islands 450 and metal traces 456) are configured with a transparent region 466 between the opaque regions. The active Si islands 450 and metal traces 456 substantially block the intensified light 216, but the intensified light 216 may be transmitted through the transparent region 466 between the Si islands 450 and metal traces 456. Metal traces called column lines 458 and row lines 462 run between the pixels, conveying signals addressed to the respective pixels. These lines are also opaque regions.

Figure 6:
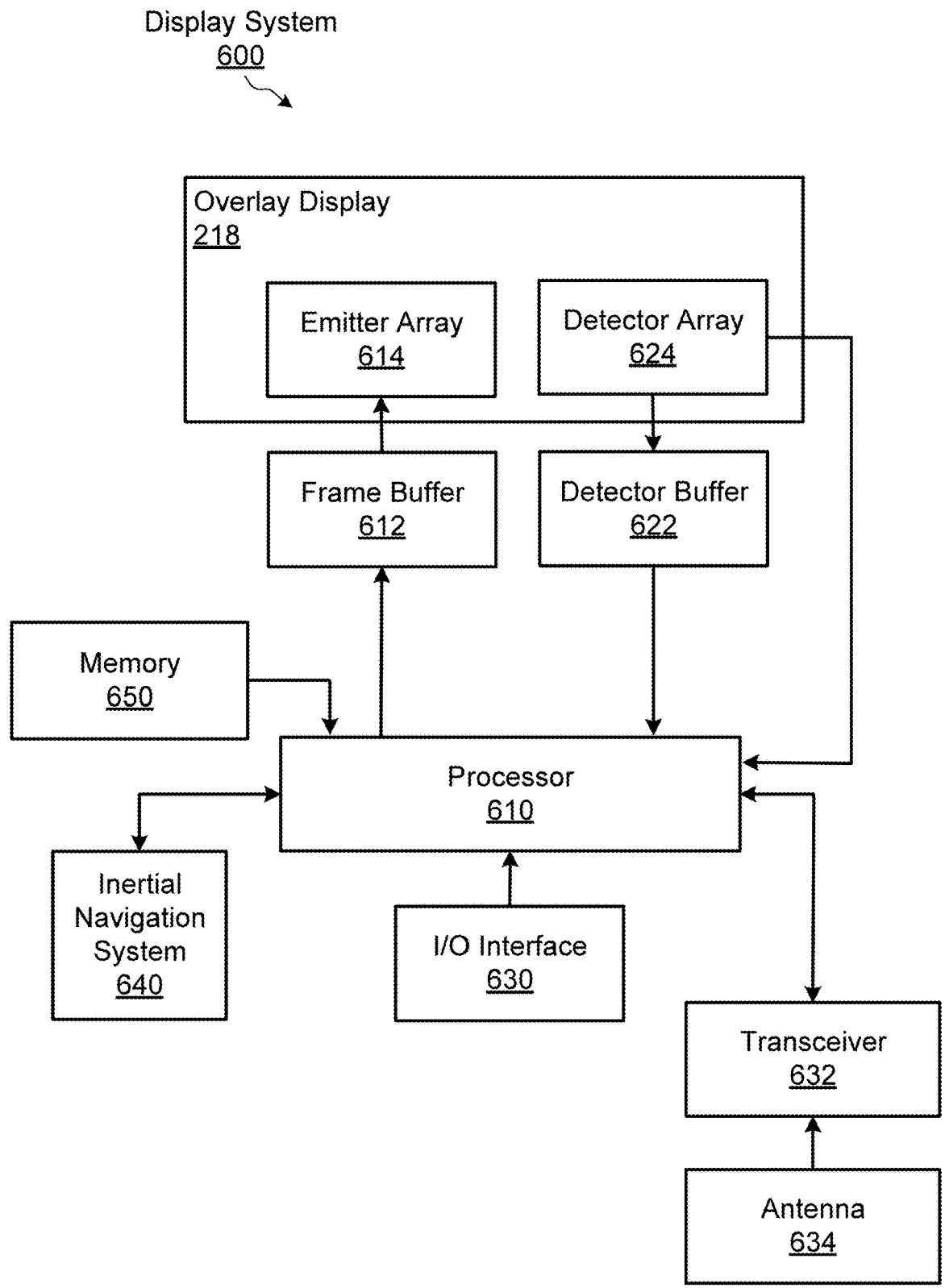
FIG. 6 illustrates a schematic diagram of a display system, according to one embodiment.

FIG. 6 illustrates an embodiment of an overlay display system 600. The display system 600 includes an overlay display 218 having an emitter array 614 that generates a display image by emitting display light 229 in accordance with pixel values stored in the frame buffer 612. For example, the emitter array 614 may be a two-dimensional (2D) array of pixels (e.g., the emitters 472 illustrated in FIG. 4A). The emitter array 614 may also include the driving electronics (e.g., FETs) in the display-control circuitry 444 that drive current through the emitters 471 to generate the display light 220. The display image is updated at a first frame rate. The display image emitted from the overlay display 218 is updated when pixel values are transferred from the frame buffer 612 to the emitter array 614.

The frame buffer 612 may be a DMA (direct memory access) hardware readout device that contains a memory array representing the pixel values of each pixel, and the memory array may represent the pixel values in a fixed order. The pixel values may be stored at dedicated memory addresses in the memory array. The display image may be updated periodically at the predetermined first frame rate by transferring the pixel values of each pixel from the frame buffer 612 to the emitter array 614.

In a separate process, the pixel values stored in the frame buffer 612 may be updated at a predetermined second frame rate. Thus, the frame rate and process of updating the frame buffer 612 may be independent of the process of updating the emitter array 614. The pixel values stored in the frame buffer 612 may be updated by the processor 610. The updating of the pixel values stored in the frame buffer 612 may proceed more slowly than the first frame rate. Further, many of these pixel values stored in the frame buffer 612 may remain the same from frame to frame while only a few pixel values change between frames. Accordingly, the rate at which new values are written to the frame buffer 612 may be independent of and decoupled from the first frame rate. Additionally, the amount of data and data rate required to update pixel values stored in the frame buffer 612 may be much less than the amount and rate of data transferred between the frame buffer 612 and the emitter array 614.

The overlay display 218 may optionally include a detector array 624 (e.g., a 2D array of the detectors 428 illustrated in FIG. 4A). Like the frame buffer 612, a detector buffer 622 may function as a buffer by storing pixel values. The detector buffer 622 stores detector signals read from respective detectors in the detector array 614. The detected values are stored at dedicated memory addresses in the detector buffer 622. The reading of the detected signal values on to the detector buffer may proceed at a third frame rate, and pixel values stored on the detector buffer 622 may be transferred to the processor 610 at a fourth frame rate, which may or may not be the same as the third frame rate. That is, the processor 610 may access/read the detected signals stored in the detector buffer 622 independently of the third frame rate.

Additionally, processor 610 may directly access the detected signals from one or more of the detectors in the array 624. For example, the processor 610 may synchronize one or more of the above-noted frame rates with a periodicity of an external light source having a time varying intensity. By synchronizing with the external light source, the detector may avoid beat patterns or other artifacts in the detected signal that may result in a glitchy appearance.

A synchronization signal, which in one embodiment may be at 60 Hz, may be used to determine the second frame rate based on the detected signals from the detector array 624. The detector array 624 may include signal conditioning circuitry (e.g., transimpedance amplifiers/buffers charge integrators, etc.) or analog to digital conversion circuitry provided in the data-handling circuitry, for example.

The detected signals may include light signals that have been encoded with data, and the processor 610 may decode the data from the detected signals received via the detector array 624. For example, infrared (IR) beacons or LiDAR signals may be transmitted within the field of view of the NV system. The light from an IR beacon may be modulated to enable blue force tracking. Blue force tracking may be provided by the light from the IR beacon indicating that the IR beacon represents a friend, as opposed to a foe.

Additionally or alternatively, the modulated light may be encoded with data representing text or other information. The processor 610 may decode the message encoded in the received signal from the detector array 624 to generate the represented text, and this text may then be displayed within a designated field in the display image, as illustrated in FIG. 8B, which is discussed below.

The display system 600 may include a memory 650, an inertial navigation system (INS) 640, an input/output (I/O) interface 630, a transceiver 632, and an antenna 634.

In certain embodiments, the display system 600 can include a processor 610 coupled to a memory 650. The processor 610 may be a simple controller. Alternatively, the processor may be CPU (e.g., an ARM architecture CPU such as the Cortex A53 by ARM Inc. or a Snapdragon 810 by Qualcomm, Inc). In certain embodiments, the processor 610 may be an on-board, intelligent controller that is on a same PC board as the overlay display.

The display system 600 may have an antenna 634 that is connected to a transceiver 632 coupled to the processor 610. The transceiver 632, the processor 610, and the memory 650 may be used for network communications.

The INS 640 of the display system 600 may include an GPS device, gyroscopes, accelerometers, magnetometers, or other sensors for position sensing and/or inertial navigation. The GPS device may be coupled to the processor 610 and used for determining time, location coordinates, and orientation coordinates, which may be displayed in the display image using the emitter array 614, as illustrated in FIG. 8B.

The processor 610 can be any programmable microcontroller, microprocessor, microcomputer or chips that can be configured by software instructions (applications) to perform a variety of functions, including functions of various embodiments described herein. The processor 610 may be field programable gate array (FPGA), an application specific integrated circuit (ASIC), or other circuitry configured to perform instructions on sets of data and store results.

Software applications can be stored in the memory 650 before they are accessed and loaded into the processor 610. The processor 610 can include or have access to the memory 650 sufficient to store the software instructions. The memory 650 can also include an operating system (OS). The memory 650 may include FLASH memory, RAM, ROM, PROM, EPROM, EEPROM, magnetic storage drive, or any type of non-transitory computer readable medium.

Additionally, the memory 650 can be a volatile or non-volatile memory, such as flash memory, or a mixture of both. For the purposes of this description, a general reference to memory refers to all memory accessible by the processor 610, including memory 650, removable memory plugged into the display system 600, and memory within the processor 610 itself, including a secure memory.

The display system 600 can also include an input/output (I/O) interface 630 to receive and transmit signal to peripheral devices and sensors, or to communicate with an external controller. For example, the I/O interface 630 may be a high-speed parallel interface that receives an updated frame each period of the frame rate. Preferably, the I/O interface 630 is a serial interface, and only a small amount of data is needed to update the frame of the display image per period of the frame rate. The I/O interface 630 may include an I/O bus and a physical port, such as a universal serial bus (USB) port, or small computer system interface (SCSI) port, or other physical digital communicans port.

For example, a significant amount (or all) of the information needed to update the frame may be obtained from other sources than the I/O interface 630. In certain embodiments, the overlay display includes symbols and text representing the position and orientation of the NV system, blue force tracking information, outline or other designators indicating objects of interest. The symbols and text representing the position and orientation of the NV system may be generated using signals from the INS 640, without requiring any data received from the I/O interface 630. The blue force tracking information may be obtained using signal obtained from the detector array 624, without requiring any data received from the I/O interface 630. The outline or other designators indicating objects of interest may be obtained using signal obtained from the detector array 624, without requiring any data received from the I/O interface 630. For example, edge detection and/or change detection signal/image processing methods may be used to determine an object moving relative to a stationary background. Accordingly, the information content and pixel values to be displayed via the emitter array 614 may be determined without requiring any data received via the I/O interface 630.

In certain embodiments, the I/O interface 630 may not be needed to receive data that is used to determine pixel values for the emitter array 614, and the I/O interface 630 may be omitted from the display system 600.

The transceiver 632 and antenna 634 may be configured to receive and transmit wireless signals, including, e.g., Bluetooth (BT) signals, Bluetooth Low Energy (BLE) signals, cellular signals, WiFi signals (e.g., IEEE 802.11 standard), Zigbee signals, or other wireless communication protocol. An external controller may communicate information to/from the processor via the I/O interface 630 or via the transceiver 632 and antenna 634.

As described in greater detail below, various embodiments of the display system 600 use one or more of the following techniques to reduce (or eliminate) the communication bandwidth required between an external controller and the processor 610 to update pixel values to be displayed by the emitter array 614. In certain embodiments, the display system 600 reduces the communication bandwidth by using a high-level language to communicate the display information at the symbol/character level, rather than the pixel level. For example, the emitter array 614 may include predefined symbol/character fields within the display area, in which fields the emitter array 614 displays text, ASCII characters, or other predefined symbols/characters in the predefined symbol/character fields. The external controller communicates digital values representing the characters or symbols rather than communicating the pixel values. Then the processor 610 determines the pixel values based on the received digital values representing the characters or symbols.

In certain embodiments, the display system 600 reduces the communication bandwidth by communicating only the pixel values that have change from their values in the previous frame. For example, in a typical application, most of the pixel values of the display will be zero (e.g. turned off) to better allow the underlying, intensified image to be unobscured by the superimposed display image. Accordingly, the communication bandwidth may be reduced by communicating only pixel values for those pixels that change between frames.

Further, in some application, the display image changes by panning (e.g., spatial translating) one or more parts of the display image from one location to another within the display image. For example, the display image may outline a moving vehicle or target, and this outline may be spatially translated to another location to within the display image as the vehicle moves relative to the background. Additionally, the outline of a moving vehicle or target may be translated within the display image as the orientation and field of view of the NV system 100 changes. Thus, even if the pixel values of the outline will remain unchanged from frame to frame, their location within the frame may change from frame to frame. That is, in certain embodiments, the pixel values in the display image will be the same, but will be spatially translated between frames. Thus, the display system 600 may reduce the communication bandwidth by communicating one or more motion vectors describing how the pixel values are to be translated, rather than communicating new pixel values. For example, the communicated information from the external controller may include motion vectors and/or pixel values for a difference image, similar to image compression protocols like JPEG, H.261, H.263, H.264, MPEG1, MPEG2, and MPEG4.

The communication bandwidth required for sending detected images from the processor 610 to an external controller can similarly be reduced by sending pixel values (and/or motion vectors) for pixels of the detected image that have changed/moved from frame to frame. For example, the detected image acquired by the detector array 624 may have substantial redundant information from frame to frame. Accordingly, the information of the detected image may be reduced by sending only pixel values for those pixel values that change between frames. Additionally, the communications of detected images to the external controller may include motion vectors and/or pixel values for a difference image, similar to image compression protocols like JPEG, H.261, H.263, H.264, MPEG1, MPEG2, and MPEG4

In certain embodiments, the display system 600 reduces the communication bandwidth to the external controller by compressing the data. For example, entropy coding, variable length coding, and other data compression techniques may be used to reduce the required bandwidth.

In certain embodiments, the display system 600 reduces the communication bandwidth to the external controller by locally determining the information to be represented in the display image, rather than relying on an external controller to provide the information to be represented.

In certain embodiments, the display system 600 reduces the communication bandwidth to the external controller by receiving the information to be represented in the display image through other channels such as through the detector array 624, the INS 640, or the transceiver 632 and antenna 634, rather than receiving the information to be represented from an external controller. Additionally or alternatively, the information to be represented in the display image may be derived from the information received through other channels. For example, the display image may include a compass representing the orientation and/or geographical coordinates derived from data from the INS 640, as illustrated in FIG. 8B.

The display system 600 may include light source such as an eye safe laser (e.g., a laser source transmitting light having a wavelength of 1550 nm), and the light source may be used for ranging and detection of a surrounding environment. The light source may be used for communication by encoding a message or data on the emitted light.

In certain embodiments, the frame buffer 612 may be part of a specialized 'frame driver' chip that is mounted on the same PC board (PCB) as the overlay display 218. The frame buffer 612 may provide a local, high-speed, parallel interface between the processor 610 and the frame buffer 612. For example, the frame buffer 612 may function as a simple DMA (direct memory access) hardware readout device. And the overlay display 218 may accept the pixel array data as a bulk write without individual headers. Further, in certain embodiments, the local frame buffer 612 may contain a memory array that represents the brightness/intensity values of each pixel in a fixed order. The display image emitted by the emitter array 614 is then simply read out of the local frame buffer 612 at a desired frame rate. The frame rate for the display image may be separately adjustable, relative to the frame rate at which the pixel values are updated in the frame buffer 612.

Figure 7:
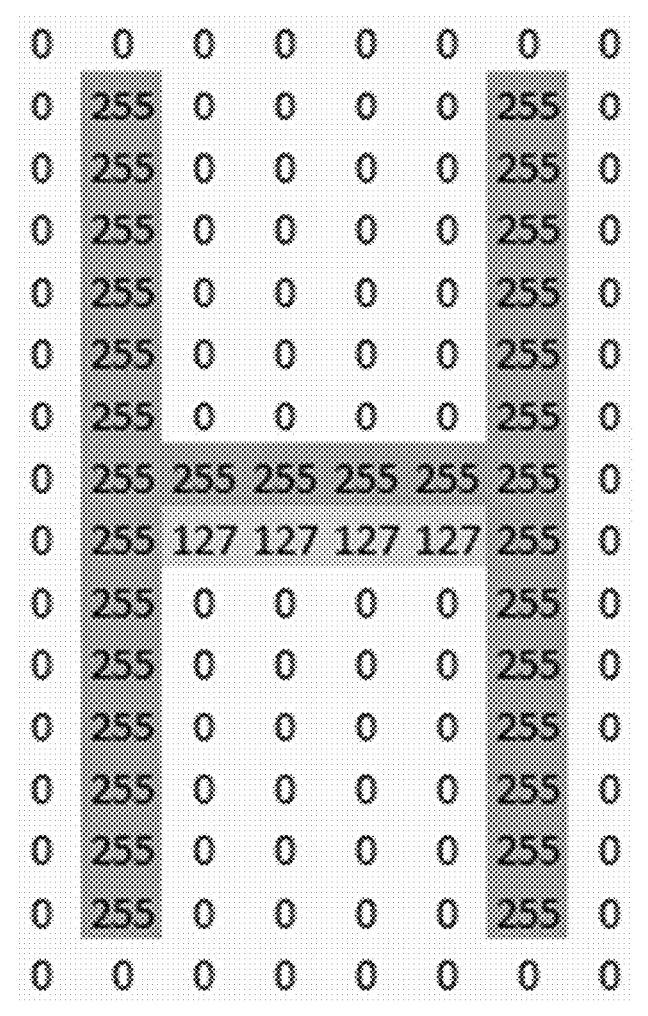

In certain embodiments, the frame buffer 612 is periodically (or nonperiodically/asynchronously) updated with new pixel values to be displayed, which can be received from the processor 610, and the new pixel values to be displayed may be determined by the processor 610 based on display information received via communications from an external controller. For example, the I/O interface 630 may have one or more low to medium speed serial communications interfaces that enables the external controller to communicate display information via a high-level language. This communication of display information from the external controller may be performed by sending a text string (e.g., a data structure including an array of alphanumeric characters or ASCII characters). The process may then determine which pixel values should be set in the frame buffer 612 to display the text string at a pre-determined location within the display image. For example, for the character "H," the 8-bit ASCII binary value "01001000" (i.e., decimal value "72") may be communicated via the I/O interface 630. Then the processor 610 may determine a series of pixel values (e.g., ranging from a minimum of 0 to a maximum of 255), as illustrated in FIG. 7, to represent the character "H," and these pixel values may be written to those memory cells in the frame buffer 612 that correspond to the designated position within the display image at which the character "H" is to be displayed. In this non-limiting example, sending a single 8-bit ASCII code rather than sending 8-bit codes for each of the of the 128 pixel values decreases the communication data size by a factor of more than 100. In other example, the decrease in communication data size (i.e., communication bandwidth) may be even larger. Thus, transmitting display information via a high-level language may greatly ease the interface requirements.

Various predefined parameters such as a font type, a font size, an anchor coordinate (e.g., the x,y values of the top left pixel for a character string), a font color, a brightness, and a contrast, may be used by the processor when determining the pixels values. These parameters may be sent together with the text message, or the parameters may have been sent previously. For example, the parameters may be set as default parameters, or they may have been set in accordance with the current or previous communications from the external controller.

As discussed above, when updating the frame of the display image, not all pixel values will change relative to the previous frame. Accordingly, the processor 610 may determine which of the pixel values are changed when updating the frame, and the processor 610 updates the pixel values in the frame buffer 612, in an intelligent way, to limit the power draw and make it scalable to the amount of change being requested by the external controller. The processor 610 may update the frame buffer 612 with only those pixel values that have changed from frame to frame and lock in the new frame content. The processor 610 may also function as a shadow register to avoid the display image having a glitchy appearance.

In certain embodiments, the detector array 624 acquires frames of detected intensities of the intensified light 216. Like the frames of the display image, many pixel values in the frames of the detected images of the intensified light 216 do not change from one frame to the next. Thus, it may be inefficient to communicate all the pixel values from the detected frames to the external controller, rather than sending only the pixel values of those pixel values that have changed. For example, this more efficient communication may be performed by calculating a difference image relative to a previous frame, and using variable length coding, run length coding, and/or entropy encoding to encode the difference image before communicating the encoded and compressed difference image to the external controller. Similar processes can be used to more efficiently encode and transmit display frame data and detected frame data to enable more efficient communications to and from the external controller. For example, the frames acquired by the detector array 624 can be processed similar to the frames of the display image by the processor 610 communicating only what changed in the frame acquired by the detector array 624 (e.g., a detected underlying tube display).

In addition to decreasing the communication bandwidth from the processor 610 to the external controller, determining and isolating the pixel values that change between detected frames (i.e., frames acquired from the detector array 624) can be used advantageously to provide auto display-over-background contrast adjustments while maintaining a low power draw, as discussed below.

In certain embodiments, the local processor 610 has an increased degree of control and autonomy and functionality that otherwise have been provided by the external controller. For example, the local processor 610, rather than the external controller, provides a frame-sync signal to control a timing of when frames are displayed on the emitter array 614 and/or another frame-sync signal to control when frames are acquired from the detector array 624. The increased autonomy of the processor 610 provides decoupling of the processor 610 from the external controller to reduce the required communication bandwidth.

In certain embodiments, the local processor 610 controls timing of detector pixel array 624. This control may be used to enable all-optical communications for the NV system 100 and for programming and/or information provision to the NV system 100. The all-optical communications may provide for communications that are not jammable or visually detectable by others (e.g., covert communications). For example, the all-optical communications may be realized using a covert eye-safe wavelength (e.g., lasers transmitting light at 1550 nm that is modulated to send information). One or more detectors in the detector array 624 may detect the intensified light 216 that has been modulated according to a message or data, for example. For the application of blue-force tracking, the received light used to generate the intensified light 216 may be infrared (IR) light that has been modulated with a pulse frequency code indicating that the source of the light is a friend, rather than a foe. Alternatively or additionally, the received light may be modulated with a text message or other data. The detector array 624 may then generate a time-series of detected values that is demodulated to recover the message. In certain embodiments, the recovered the message may be displayed as text in the display image. In certain embodiments, the recovered the message may include coordinates of a friend's location. The recovered message may include instructions to modify how the NV system operates. For example, all optical communications may be used to update or upgrade the firmware of the NV system.

In certain embodiments, the external controller may communicate with the NV system via wireless communications. As discussed above, the local processor 610 may provide functionality that would otherwise be performed by the external controller, thereby reducing the amount of information to be communicated from the external controller. Reducing the amount of information and communication bandwidth to and from the external controller reduces the power draw and reduces the interface pin count, decreasing the system size and complexity of the communication interface. Accordingly, the communication interface may be realized with as few as 4 traces/pins. Additionally or alternatively, the communication interface may be realized using Bluetooth (BT), Bluetooth Low Energy (BLE), ANT Wireless (ANT), cellular wireless communications, WiFi (e.g., IEEE 802.11 standard), Zigbee wireless communications.

In certain embodiments, the processor 610 may receive an instruction in a high-level language regarding what symbols to display in the display image. The processor 610 may receive, via the communication interface (e.g., the I/O interface 630, the detector array 624, or the transceiver 632) data indicating symbols to be represented within the display image. The processor 610 may determine the pixel values for the display image based on the symbols indicated in the data. Then the processor 610 may update the pixel values stored in the frame buffer 612 based on the determined pixel values to be represented within the display image.

The memory 650 may store information relating pixel values to respective symbols (e.g., a look-up-table indexed by the respective symbols that outputs an array of pixel values used to represent the given symbol). The symbols to be represented within the display image may include one or more types of symbols including, e.g., alphanumeric characters, ASCII characters, pictograms, icons, a reticle, a compass, and an outline.

Figure 8A:
FIG. 8A illustrates an intensified image without an overlay image superimposed on the intensified image, according to one embodiment.
Figure 8B:
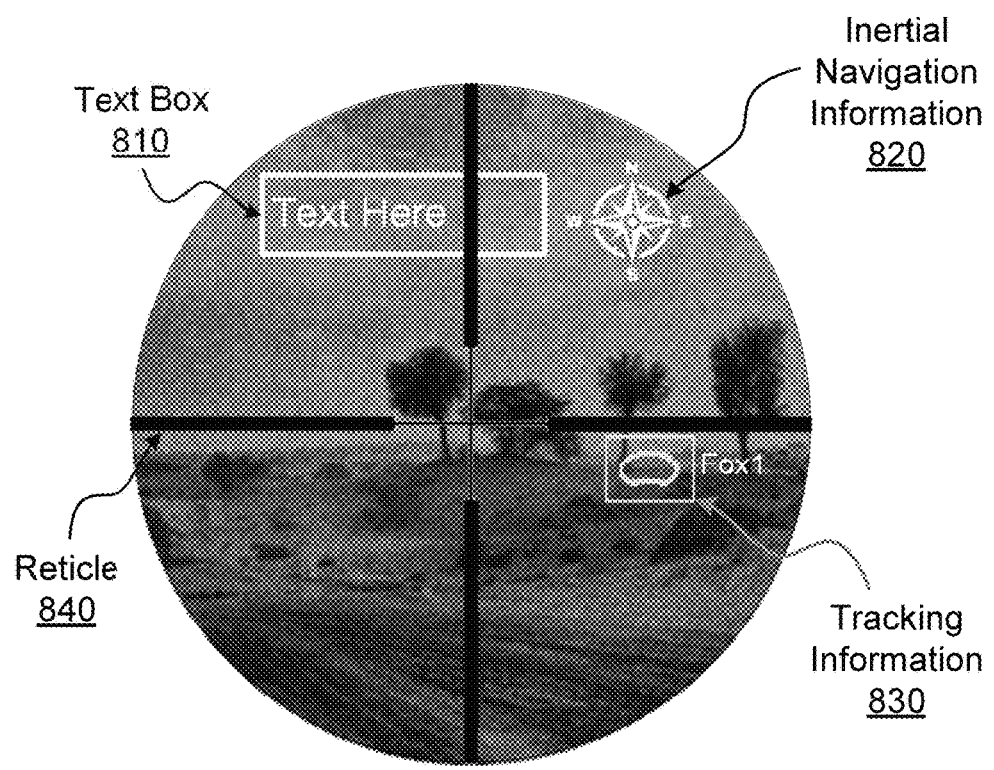
FIG. 8B illustrates an intensified image with an overlay image superimposed on the intensified image, according to one embodiment.

FIG. 8A illustrates an underlying image (e.g., an intensified image from an analog NV system), and FIG. 8B illustrates a display image superimposed over the underlying image. In FIG. 8B, a text box 810 is illustrated with the text "Text Here" provided within the text box. In the display image, the text "Text Here" may be displayed without displaying an outline of the text box. The text box may be defined by specifying the coordinates of the box 810 (e.g., the upper left corner of the text box), the font, the font size, the font color, and the brightness and/or contrast. The high-level instructions may include a font, a font size, an anchor coordinate, a font color, an array of alphabetic characters to be displayed, a brightness, and a contrast of the symbols to be displayed.

In FIG. 8B, inertial navigation information 820 is illustrated, and a reticle 840 and tracking information 830 are also illustrated. Some of the illustrated symbols may be determined locally by the processor 610 without requiring external information being provided by an external controller.

In certain embodiments, the protocol for determining pixel values within the text box 810 may use a simple high-level instruction providing the text or symbol to be inserted via an insertion command. The insertion command may be listed as a 'block of pixels' (e.g., a font character) with a specified origin for the symbol's origin position (e.g. at pixel 760,881). A symbol library may be pre-installed and stored in the memory 650. Then the pixel locations may be recalled from memory by calling the stored data as command line packet. Additionally, the insertion command may specify an overall size and pixel value (e.g., scaled as a block from the default max size & brightness). Accordingly, the block can have a relative shape and brightness variation in accordance with instructions (e.g., user preferences). To provide error checking and/or correction, the insertion command may include a checksum or error correction option.

In certain embodiments, the insertion command may be provided for a block of pixels as small as a single pixel. More generally, the insertion command may be provided for a block of any shape or configuration. Further, the insertion command may be built up with added commands or by creating a new block. This could be done in real time. Generally, the use of this type of the insertion command provides data compression that keeps the overall communication bandwidth low. By keeping the overall communication bandwidth low, the pixel value processing may be performed, e.g., by simple microcontrollers rather than by an FPGA, which consumes more power.

In certain embodiments, feedback from the detector array 624 is used to adjust an intensity of the display image to be balanced relative to the intensified image. For example, if the intensified image is much dimmer than the display image, then the intensified image may be difficult to see because it is overwhelmed by the brighter display image. Thus, the intensity of the display image may be adjusted to be commensurate with the average (local) intensity of the intensified image. For example, when the intensified image is dim, the intensity of the display image is reduced accordingly to also be dim. Similarly, when the intensified image is bright, the intensity of the display image is increased accordingly to also be bright. This intensity adjustment of the display image may be global (e.g., the entire display image) or local (e.g., local regions of the display image may be adjusted brighter or dimmer depending on the local intensity of the intensified image). The local memory 650 may store an auto-contrast, brightness-adjustment control table that balances the intensity of the display image relative to the detected intensity of the intensified image, which is detected via the detector array 624.

Additionally, even when equal currents are used to drive respective emitters, different emitters in the emitter array 614 may emit with different intensities due to non-uniform manufacturing defects resulting in non-uniform emission efficiencies. Accordingly, the emission efficiencies of the different emitters of the emitter array 614 may be calibrated, and a correction factor stored in the local memory 650. Additionally or alternatively, the detection efficiencies of the different detectors of the detector array 624 may be calibrated, and a correction factor stored in the local memory 650. That is, the memory 650 may store a non-uniformity correction(s), which is a fixed array to correct for display brightness and/or detector efficiency variations across the image plane.

Additionally, as discussed above, the memory 650 may store the auto-contrast, brightness-adjustment control table, which may be dynamically updated locally. Given the brightness/intensity adjustments together with the detector/ emitter efficiency correction factor that are performed locally via the memory 650 and the processor 610 rather than via an external controller, the communication bandwidth with the external controller may be reduced and the communication interface may be simplified. For example, the external controller may only be needed to supply the information that is conveyed in the display image—not the hardware level controls.

In certain embodiments, the processor 610 may provide a local sync functionality. For example, the signals from the detector array 624 may be processed to determine periodic brightness fluctuations in the intensified light 216 resulting from the background. Based on the signals from the detector array 624, a sync may be determined to synchronize the frame rate to the periodic background fluctuations (e.g., the display image frame rate and/or detector array frame rate may be synchronized to the periodic background fluctuations). The local sync functionality may provide automatic gating from a supply of an electron tube used to intensify the light. The electron tube intensifies the light received from the environment by accelerating electrons, which are generated when the received light strikes a photocathode, across an electric potential provided by the electron tube before the accelerated electrons pass through a microchannel plate, multiplying the number of electrons through interactions with the side walls of the microchannel plate. The local sync functionality helps to avoids beat patterns, which appear as pulsing of the intensified image.

In certain embodiments, the sync functionality may be advantageously used to realize additional functionality. For example, the sync functionality may be used with pulse frequency code IR beacons located with friendly users (e.g., aviation or ground). This additional functionality would help to identify unknown people/entities and/or identify their position relative to the NV system 100. Thus, the sync functionality may offer enhanced blue-force spatial awareness (SA) in GPS denied areas.

In certain embodiments, the signals from the detector array 624 (e.g., together with the INS 640) may be used to provide feedback for quasi-inertial and/or passive visual image processing of point positions to generate a map of known points within line-of-sight of the NV system 100 (e.g., known points within line-of-sight may be provided by IR beacons transmitting known pulse frequency codes). The provided feedback may be used together the GPS data (while in an area with access to GPS signals) to train and improve blue-force tracking accuracy to better account for beacon movement characteristics in real time. Some embodiments may rely on only non-GPS data but use GPS data as feedback to be trained while in areas with access to GPS signals, such that later when in a GPS-denied area the performance will be improved when using only non-GPS data. Thus, an improved algorithm can be learned with improved GPS-denied blue-force tracking accuracy. Similarly, algorithms may also be improved for gyro drift compensation via image processing based on the signals from the detector array 624.

In certain embodiments, the display system 600 may enable passive ranging. Additionally, augmented reality icons, such as the tracking information 830, may be used. Based on passive ranging, the display system 600 may determine whether the object indicated by a given augmented reality icon is located inside or outside a same building as the NV system 100. Based on this determination, the symbol used as the augmented reality icon may change to indicate the object's relative location (e.g., in or out the same building as the NV system 100). Thus, symbology indicators may change based on information of a user's field of view (FOV) in real time.

In certain embodiments, the NV system 100 may include a covert, eye-safe range finder (e.g., a frequency modulated or pulsed laser emitting light having a wavelength of 1550 nm). The signals from the range finder may be used to improve the accuracy of blue-force tracking, especially in GPS denied areas. For example, the signals from the range finder may be used to provide range information that supplements the angular information determined from the signals from the detector array 624.

In the examples above it should be noted that although not shown various alternatives can be implemented. For example, in any of the embodiments illustrated, a backside fill may be used or may be omitted. Alternatively, or additionally, while the active areas have been shown as being substantially square in nature, it should be appreciated that the active areas may be rectangular or other appropriate shapes.

The discussion above refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A head mounted night vision system comprising:
a semiconductor chip configured to receive first light of an underlying image, the underlying image being an image from a night vision device, and superimpose second light of a display image over the underlying image, the semiconductor chip comprising
light emitters formed on the semiconductor chip to emit the second light, the light emitters representing respective pixels of the display image, the light emitters being configured to emit the second light with an intensity emitted based on respective pixel values of the display image, and transparent regions being arranged between the light emitters;
a frame buffer configured to store pixel values in a computer readable memory, and configured to communicate, at a first frame rate, the pixel values to the light emitters; and
a processor configured to update, at a second frame rate, slower than the first frame rate, pixel values stored in the frame buffer.

2. The head mounted night vision system of claim 1, further comprising
a communication interface configured to provide communications between the processor and an external controller, wherein
the processor is configured to
receive, via the communication interface, data that indicates symbols to be represented within the display image, determine the pixel values based on the indicated symbols to be represented within the display image, and update the pixel values stored in the frame buffer based on the determined pixel values.

3. The head mounted night vision system of claim 2, further comprising a memory storing symbol data indicating pixel values that represent respective symbols, wherein the symbols to be represented within the display image include one or more types of symbols selected from the group of alphanumeric characters, ASCII characters, pictograms, icons, a reticle, a compass, and an outline, and the processor is configured to determine the pixel values of the indicated symbols by retrieving the corresponding symbol data from the memory.

4. The head mounted night vision system of claim 2, wherein the symbols to be represented within the display image include text, and the data indicating symbols that was received via the communication interface includes one or more parameters selected from a font, a font size, a coordinate, a font color, an array of alphabetic characters to be displayed, a brightness, and a contrast.

5. The head mounted night vision system of claim 2, wherein the processor is configured to update the pixel values stored in the frame buffer by determining changed pixels having a pixel value that changed relative to a previous frame of the display image and updating pixel values of the changed pixels without updating pixel values of the remaining pixels that have not changed relative to the previous frame.

6. The head mounted night vision system of claim 1, further comprising a communication interface configured to provide communications between the processor and an external controller, wherein the processor is configured to receive, via the communication interface, data that indicates pixel values that changed relative to a previous frame of the display image and the data excludes pixel values that have not changed relative to the previous frame, and update the pixel values stored in the frame buffer based on the data.

7. The head mounted night vision system of claim 6, wherein the processor is configured to determine the pixel values based on the data, and the data indicates the pixel values by providing a difference between the pixel values in a current frame and the pixel values in the previous frame, by providing the pixel values in the current frame, by providing motion vectors for the pixel values between the current frame and the previous frame, or by providing a combination of motion vectors and differences between the pixel values.

8. The head mounted night vision system of claim 6, wherein the processor is configured to determine the pixel values based on the data, and the data is compressed using a video-compression process.

9. The head mounted night vision system of claim 1, further comprising a plurality of detectors arranged to coincide with respective pixels of the display image and detect an intensity of the first light, wherein the processor is further configured to determine the pixel values of the display image based on the detected intensity of the first light and update the pixel values stored in the frame buffer in accordance with the determined pixel values.

10. The head mounted night vision system of claim 9, wherein the processor is further configured to demodulate the detected intensity of the first light to decode message information, and determine the pixel values based on the message information and update the pixel values stored in the frame buffer in accordance with the determined pixel values.

11. The head mounted night vision system of claim 10, wherein the processor is further configured to demodulate the detected intensity of the first light, wherein the first light includes light from an infrared (IR) beacon indicating a friend, and the determined pixel values indicate a position of the IR beacon as corresponding to the friend.

12. The head mounted night vision system of claim 9, further comprising a light emitter configured to emit third light, which is detected by one or more of the plurality of detectors and processed by the processor to generate detection information and/or ranging information based on scatter of the third light from an environment, wherein the processor is further configured to determine pixel values of the display image based on the detected intensity of the scattered third light and update the pixel values stored in the frame buffer in accordance with the determined pixel values.

13. The head mounted night vision system of claim 9, further comprising a communication interface configured to communicate data between the processor and an external controller, wherein the processor is configured to determine changed pixel values for a current frame of detected pixel values that are detected by the plurality of detectors, the changed pixel values corresponding to pixels of the plurality of detectors for which detected intensities of the current frame have changed relative to detected intensities of a previous frame to the current frame, and transmit, via the communication interface, the changed pixel values to the external controller.

14. The head mounted night vision system of claim 9, wherein the processor is further configured to determine a synchronization signal based on the detected intensity from the plurality of detectors.

15. The head mounted night vision system of claim 9, wherein the processor is further configured to adjust pixel values of the display image based on the detected intensity from the plurality of detectors.

16. The head mounted night vision system of claim 9, wherein the processor is further configured use the plurality of detectors to receive optical communications.

17. The head mounted night vision system of claim 1, wherein the processor and frame buffer are provided on the semiconductor chip together with the light emitters.

18. The head mounted night vision system of claim 1, further comprising a wireless transceiver and antenna configured to receive data, wherein the processor is configured to
receive data via the wireless transceiver, the data indicating symbols to be represented within the display image,
determine the pixel values based on the indicated symbols to be represented within the display image, and
update the pixel values stored in the frame buffer based on the determined pixel values.

19. A method of updating pixel values of a display image superimposed over an underlying image in a head mounted night vision system, the method comprising:
transmitting first light representing an underlying image through transparent regions of a semiconductor chip, the underlying image being generated by a night vision device, the semiconductor chip configured to superimpose second light of a display image over the underlying image,
emitting the second light from light emitters formed on the semiconductor chip, the light emitters representing respective pixels of the display image, the light emitters being configured to emit the second light with an intensity based on respective pixel values of the display image, wherein the transparent regions transmitting the first light being arranged between the light emitters,
storing the pixel values in a frame buffer comprising a computer readable memory,
transferring, at a first frame rate, the pixel values stored in the frame buffer to the light emitters, and
a processor updating, at a second frame rate, slower than the first frame rate, the pixel values stored in the frame buffer.

20. The method of claim 19, further comprising
detecting an intensity of the first light, the intensity being detected using a plurality of detectors arranged to coincide with respective pixels of the display image; and
determining, using the processor, the pixel values of the display image based on the detected intensity of the first light and updating the pixel values stored in the frame buffer in accordance with the determined pixel values.

* * * * *